United States Patent
Sasaki et al.

[11] Patent Number: 5,986,788
[45] Date of Patent: Nov. 16, 1999

[54] MICROOPTICAL SYSTEM FOR FREE-SPACE OPTICAL INTERCONNECTION AND ITS SETTING METHOD

[75] Inventors: Hironori Sasaki; Keisuke Shinozaki, both of Tokyo, Japan

[73] Assignee: Oki Electric Industry Co., Inc., Tokyo, Japan

[21] Appl. No.: 08/670,356

[22] Filed: Jun. 25, 1996

[30] Foreign Application Priority Data

Jun. 26, 1995 [JP] Japan .................................... 7-159561
Nov. 30, 1995 [JP] Japan .................................... 7-312398

[51] Int. Cl.$^6$ .................................................. H04B 10/00
[52] U.S. Cl. ............................ 359/163; 359/718; 385/14
[58] Field of Search ................................. 359/163, 130, 359/131, 172, 152, 569, 570, 573, 575, 718, 720, 796; 385/14, 33, 37

[56] References Cited

U.S. PATENT DOCUMENTS

| | | | |
|---|---|---|---|
| 5,093,879 | 3/1992 | Bregman et al. | 385/93 |
| 5,412,506 | 5/1995 | Feldblum et al. | 385/569 |
| 5,532,856 | 7/1996 | Li et al. | 359/118 |
| 5,568,574 | 10/1996 | Tanguay et al. | 385/14 |

FOREIGN PATENT DOCUMENTS

| | | |
|---|---|---|
| A-0463390 | 1/1992 | European Pat. Off. . |
| A-0560511 | 3/1992 | European Pat. Off. . |

OTHER PUBLICATIONS

Frank Sauer, Jurgen Jahns & Casimir R. Nijander; Refractive–diffractive microoptics for permultation interconnects; Optical Engineering; May 1994; vol. 33 No. 5.

Optical Engineering, vol. 33, No. 5, May 1, 1994, pp. 1550–1560, XP000440831 Sauer, F. et al.,: "Refractive–Diffractive Micro–Optics for Permutation Interconnects".

Applied Optics, vol. 32, No. 26, Sep. 10, 1993, pp. 5010–5021, XP000393401 Kostuk, R.K. et al.: "Distributed Optical Data Bus for Board–Level Interconnects".

Optics Communications, vol. 109, No. 3/04, Jul. 1, 1994, pp. 328–337, XP000448151 Jahns, J. et al.: "Parallel Optical Interconnections Using Surface–Emitting Microlasers and a Hybrid Imaging System".

Optical and Quantum Electronics, vol. 24, No. 4, Apr. 1992, London, pp. 465–477, XP000431185 McCormick et al., F.B.: "Optical Interconnections Using Microlens Arrays".

1993 Proceedings, 43rd Electronic Components & Technology Conference, Jun. 1–4, 1993, Buena Vista Palace, Orlando, FL.

Primary Examiner—Rafael Bacares
Attorney, Agent, or Firm—Rabin & Champagne, P.C

[57] ABSTRACT

To provide a microoptical system for free-space optical interconnection capable of relaxing the arrangement accuracy of a light source and a photodetector. A point light source and a photodetector are interconnected each other by first and second imaging lenses and focused Gaussian beams. In this case, the point light source, first imaging lens, second imaging lens, and photodetector are positioned so that the effective beam radius $\omega_2$ of a focused Gaussian beam on the first interconnecting lens is larger than the effective beam radius $\omega_4$ of a focused Gaussian beam on the second imaging lens.

16 Claims, 11 Drawing Sheets

MICROOPTICAL SYSTEM FOR FREE-SPACE OPTICAL INTERCONNECTION AND ITS SETTING METHOD

BACKGROUND OF THE INVENTION

1. Field of the Invention

The present invention relates to a microoptical system which is one of the arts for interconnection between electronics chips used for free-space optical interconnection and its setting method.

2. Description of the Related Art

The free-space optical interconnection is noticed because of the large bandwidth characteristic of light and the profitability of parallel processing. Moreover, it is known that a packaged optical system has a high reliability and it can be made compact in the art of interconnection between chip modules used for the free-space interconnection. One of the packaged optical systems is disclosed in Document I: "Optical Engineering" Vol. 33, pp. 1550–1560 (1994)".

Generally, in the case of the free-space optical interconnection, signals are propagated and combined in the form of light by using a lens and a mirror and making the most use of the degree of freedom of a three-dimensional space without using any optical fiber or optical waveguide. The optical interconnection system includes the following three types as shown in FIGS. 11(A), 11(B), and 11(C):

<1> a macrooptical system for optically imaging an element array or one chip module S comprising point-light-source elements s on an element array or the other chip module D comprising photodetector elements d in batch by common macro lenses M1 and M2 {FIG. 11(A)}, <2> a hybrid optical system in which each point-light-source element s is collimated by a lens m1 and each photodetector element d is collimated by a lens m2, and they are connected each other by being optically imaged through macro lenses M1 and M2 {FIG. 11(B)}, and <3> a microoptical system in which each point-light-source element s is collimated by a lens m1 and each photodetector element d is collimated by a lens m2, and these collimated beams are directly connected each other at an equal beam radius without using any microlens or macro lenses.

Among these systems, the microoptical system <3> is more advantageous than two other systems in that any interconnection pattern can be realized.

In the case of the free-space optical interconnection of the microoptical system, it is one of the requisites for design to take a long interconnection length because it is more preferable from the view point of designing the architecture of the system that electronics chips farther separate from each other can be interconnected. In the case of a collimated optical system, however, it is impossible to take a long-enough interconnection length because of the diffraction effect. Therefore, a method for increasing the above optical interconnection length by using an optical system in which two microlenses are arranged so that a beam waist (imaged point) is set between the both microlenses is proposed in the above Document I.

This method for using a Gaussian optical system uses two imaging lenses to perform imaging from a point light source to an intermediate image by the first imaging lens and performs imaging from the intermediate image onto the light receiving plane of a photodetector by the second imaging lens. Moreover, in the case of this method, the value of the beam waist of the intermediate image for maximizing the distance (that is, interconnection length) between the two imaging lenses is obtained as a function of effective beam radiuses of two imaging lenses.

In the case of this microoptical system, however, the request for the arrangement accuracy of a point light source and a photodetector is severe and therefore, a positioning accuracy of approx. 1 to 2 μm has been requested so far.

In general, however, the free-space optical interconnection between electronics chips is complex and any electronics chip is interconnected with other electronics chips. Thus, the conventional method for successively arranging electronics chips while monitoring the incident power of light or amount of light of a photodetector is not proper because it is considered that positioning errors are accumulated. Therefore, it is considered that it is necessary to design an optical-interconnection optical system for combining electronics chips by giving an allowance capable of absorbing point-light-source positional-deviation errors caused by flip chip bonding to the system and individually fixing the chips at an independent positioning accuracy by means of the flip chip boding. In this connection, there is a report that an experimental error of flip chip bonding is approx. 2 to 5 μm (Document II: "IEEE Photonics Technology Letters, Vol.4 pp. 1369–1372, 1992"). Therefore, to mass-produce microoptical systems, the advent of a microoptical system for free-space optical interconnection capable of relaxing the positioning accuracy of each element constituting an electronics chip up to a level adaptable to mass production and its setting method has been desired.

SUMMARY OF THE INVENTION

The present invention lowers a requested positioning-accuracy level by using focused Gaussian beams.

Therefore, the microoptical system of the present invention for free-space optical interconnection comprises:

a point-light-source element group;

a first microlens group including a plurality of first microlenses respectively provided correspondingly to each point-light-source element of said element group;

a photodetector element group; and a second microlens group including a plurality of second microlenses respectively provided correspondingly to each photodetector element of said element group, in order to optically interconnect said first and second microlenses each other by Gaussian beams without using any microlens; wherein said point-light-source elements, first microlenses, second microlenses, and photodetector elements are positioned so that an expression of $\omega_2 > \omega_4$ (where, $\omega_2$ and $\omega_4$ are positive values) is effected when using first and second microlenses as imaging lenses and assuming the effective Gaussian-beam radius of said first microlens as $\omega_2$ and said effective Gaussian-beam radius of said second microlens as $\omega_4$.

Moreover, the method of the present invention for setting a microoptical system for free-space optical interconnection characterized in that the following are assumed:

$\omega_1$—beam waist of Gaussian beams of point-light-source element;

$\omega_2$—effective Gaussian-beam radius of first microlens;

$\omega_3$—beam waist of Gaussian beams of intermediate image of point-light-source element after first microlens;

$\omega_4$—effective Gaussian-beam radius of second microlens;

$\omega_5$—beam waist of Gaussian beams at light receiving plane of photodetector element;

$L_1$—distance from point-light-source element to first microlens;

$L_2$—distance from first microlens to intermediate image;

$L_3$—distance from intermediate image to second microlens;

$L_4$—distance from second microlens to light receiving plane of photodetector;

$f_1$—focal length of first microlens;

$f_2$—focal length of second microlens;

$\lambda$—wavelength of Gaussian beams; and $\pi$—ratio of circumference of circle to its diameter, and moreover characterized in that:

(a) said $\lambda$, $\omega_1$, and $\omega_5$ are previously determined as known values;

(b) each of said $L_1$, $L_2$, $L_3$, $L_4$, and $f_2$ is obtained as a function of any two or more of $\omega_1$, $\omega_2$, $\omega_3$, $\omega_4$, and $\omega_5$ by using a ray matrix (also known as ABCD law or ABCD matrix);

(c) $\omega_3$ providing the maximum distance Lmax of combination lengths ($L_2+L_3$) between said first and second microlenses, $\omega_3$ and the maximum distance Lmax are obtained from the following expressions (I) and (II);

$$\begin{cases} L_1 = \frac{\pi\omega_1}{\lambda}\sqrt{\omega_2^2 - \omega_1^2} \\ L_2 = \frac{\pi\omega_3}{\lambda}\sqrt{\omega_2^2 - \omega_3^2} \\ L_3 = \frac{\pi\omega_3}{\lambda}\sqrt{\omega_4^2 - \omega_3^2} \\ L_4 = \frac{\pi\omega_5}{\lambda}\sqrt{\omega_4^2 - \omega_5^2} \end{cases} \quad (I)$$

$$\omega_3 = \frac{\omega_2 \omega_4}{\sqrt{\omega_2^2 + \omega_4^2}} \quad (II)$$

(d) therefore, $\omega_2$ and $\omega_4$ meeting the above expression (II) are determined as values meeting said expression $\omega_2 > \omega_4$ while considering design conditions by first providing the designed value of the maximum distance Lmax of said combination lengths;

(e) $\omega_3$ is determined by these $\omega_2$ and $\omega_4$ in accordance with said expression (II); and (f) said $L_1$, $L_2$, $L_3$, $L_4$, $f_1$, and $f_2$ are determined by these $\omega_1$, $\omega_2$, $\omega_3$, $\omega_4$, and $\omega_5$ to position said point-light-source element, first microlens, second microlens, and photodetector element.

In this case, the ray matrix which is also called as the ABCD law or ABCD matrix, is a matrix showing the relation between incoming position (or position of incidence) and incoming angle (or incident angle) on the incoming plane (or plane of incidence) of geometric rays on one hand and incoming position and incoming angle on the outgoing plane (or plane of exit) of the rays on the other, which is defined every lens, mirror, or free space. Thus, actions of beams on any plane can be described in accordance with a ray matrix obtained by multiplying ray matrixes in the sequence of propagation of rays. This ray matrix is generally known and its details are disclosed in, for example, Document III: "Proceedings of the IEEE, Vol.54, pp. 1312–1329 (1966)", Document IV: "HIKARI ELEKUTORONIKUSU NO KISO" (English version of which is "Foundation of Optoelectronics") (Third edition of the original), Chapter 2, MARUZEN (Issued in 1988)", and Document V: "HIKARI DEBAISU NO TAME NO HIKARIKETUGOKEI NO KISO TO OYO (English version of which is "Foundation and Application of Optical Coupling System for Optical Devices"), Chapter 2, GENDAIKOGAKUSHA (transliterated), Issued in 1991".

Design conditions to be considered to determine $\omega_1$ and $\omega_4$ are those specified for design including the distance between point-light-source elements, distance between photodetector elements, distance between point light source and first microlens, distance between photodetector and second microlens, and allowable range of positional deviation errors of the point-light-source and photodetector elements.

In the case of the microoptical system and its setting method of the present invention, the effective radius $\omega_2$ of Gaussian beams of a first microlens is made larger than the effective radius $\omega_4$ of Gaussian beams of a second microlens (in this case, $\omega_2$ and $\omega_4$ are positive values). Therefore, it is possible to make the beam radius on the second microlens smaller than the aperture of the lens and also decrease the amount of light not transmitting the second microlens due to the positional deviation, particularly, the horizontal positional deviation of a point-light-source element, that is, increase the amount of light (or optical power or luminous energy) entering the second microlens (therefore, transmission amount of light (or transmission optical power or transmission luminous energy)). Therefore, the present invention makes it possible to position point-light-source and photodetector elements at a positioning accuracy with a high mass productivity and an ignorable small luminous-energy loss because the amount of light entering the second microlens or photodetector is not practically decreased even if the level of the positioning accuracy of each element, particularly each light source or photodetector is lowered.

BRIEF DESCRIPTION OF THE DRAWINGS

The foregoings and other objects, features and advantages of the present invention will be better understood from the following description taken in connection with the accompanying drawings, in which.

DETAILED DESCRIPTION OF THE PREFERRED EMBODIMENT

An embodiment of the present invention is described below by referring to the accompanying drawings. In the figures, the shapes and size of constituents as well as the positional relationship therebetween are drawn schematically so as to merely facilitate the understanding of the present invention.

Figure 1:
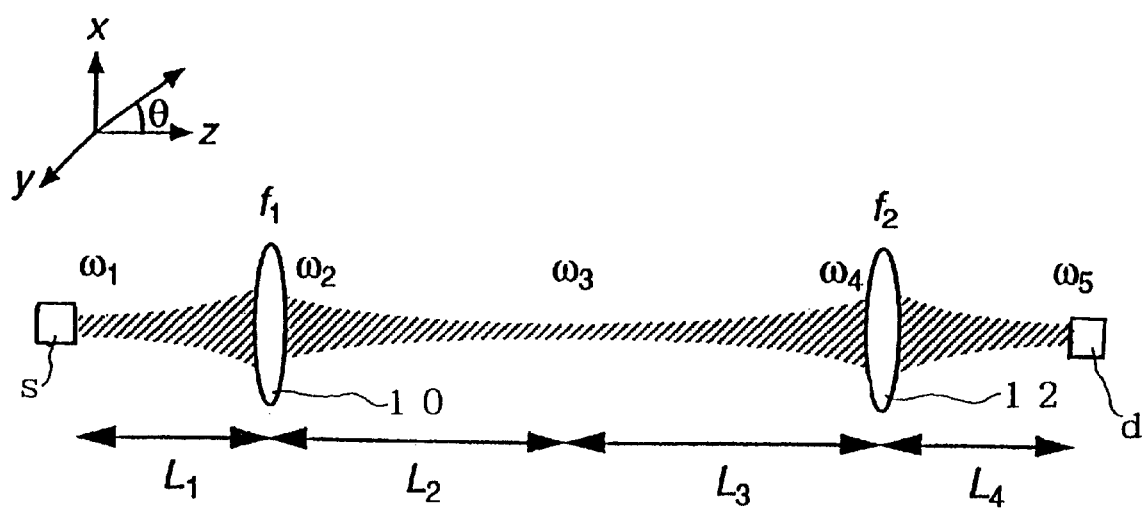
FIG. 1 is an illustration for explaining the microoptical system for free-space optical interconnection and its setting method of the present invention.

FIG. 1 is a model view of a microoptical system for explaining the microoptical system for free-space optical interconnection and its setting method of the present invention. In the case of this optical system, rays are focused Gaussian beams. Moreover, FIG. 1 shows a point-light-source element (e.g. semiconductor laser) (hereafter referred to as a light source) s at the object space side, a first microlens 10 with a focal length $f_1$, a second microlens 12 with a focal length $f_2$ at the image space side, and a photodetector element (hereafter referred to as a photodetector) d. This optical system is an imaging optical system using the first and second microlenses 10 and 12 as convex lenses. The image of the light source s is formed as an intermediate image by the first lens 10 and moreover, the intermediate image is formed on the light receiving plane of the photodetector d by the second imaging lens 12. The first and second lenses are those for image formation and referred to as imaging lens, respectively.

Moreover, $\omega_1$ represents the beam waist of Gaussian beams at a light source, $\omega_2$ represents the effective Gaussian-beam radius on the surface of the first imaging lens 10, $\omega_3$ represents the beam waist of Gaussian beams of the intermediate image of the light source s by the first microlens, $\omega_4$ represents the effective Gaussian-beam radius on the surface of the second imaging lens 12, and $\omega_5$ represents the beam waist of Gaussian beams on the light receiving plane of the photodetector d. Furthermore, $L_1$ represents the distance between the light source s and the first imaging lens 10, $L_2$ represents the distance between the first imaging lens 10 and the intermediate image, $L_3$ represents the distance between the intermediate image and the second imaging lens 12, and $L_4$ represents the distance between the second imaging lens 12 and the light receiving plane of the photodetector d.

The first and second microlenses described above are individual lenses respectively corresponding to a light source or photodetector one to one, which can use any one of an embossed lens, a lens made by ion exchange, and a lens using a computer generated hologram, or a compound lens.

Moreover, light-source and photodetector element groups are included in an electronic module in order to exchange optical signals together with an electronics circuit provided to process signals and drive light sources.

Then, operations of the microoptical system of the present invention are described below. Rays emitted from the light source s are Gaussian beams having a Gaussian electric-field distribution independently of whether the rays are coherent rays or incoherent rays. Therefore, actions or behavior of Gaussian beams can be described by using a ray matrix (ABCD law or ABCD matrix). The distances $L_1$, $L_2$, $L_3$, and $L_4$ between the lenses 10 and 12 on one hand and the beam waists $\omega_1$, $\omega_3$, and $\omega_5$ can be obtained from the following expression (1) in accordance with a ray matrix by using the corresponding effective beam radiuses $\omega_2$ and $\omega_4$ and a light-source wavelength (light wavelength) λ to be used.

$$\begin{cases} L_1 = \frac{\pi\omega_1}{\lambda}\sqrt{\omega_2^2 - \omega_1^2} \\ L_2 = \frac{\pi\omega_3}{\lambda}\sqrt{\omega_2^2 - \omega_3^2} \\ L_3 = \frac{\pi\omega_3}{\lambda}\sqrt{\omega_4^2 - \omega_3^2} \\ L_4 = \frac{\pi\omega_5}{\lambda}\sqrt{\omega_4^2 - \omega_5^2} \end{cases} \quad (1)$$

As already described, it is commonly requested for free-space optical interconnection to maximize the interconnection length L ($=L_2+L_3$) between the two imaging lenses 10 and 12. Conditions for maximizing the interconnection length L can be obtained from the following description as also disclosed in Document I. That is, in general, a Gaussian beam is uniquely obtained by determining the radiuses at beam waists and wavelength λ of the beam. In the case of the optical system shown in FIG. 1, the beam waists $\omega_1$ and $\omega_5$ of the light source s and the photodetector d, depend on a semiconductor device to be used. Moreover, it is possible to uniquely express $L_2$ and $L_3$ for determining the interconnection length L by the mathematical expression (1) by using $\omega_2$, $\omega_3$, and $\omega_4$. In general, $\omega_2$ and $\omega_4$ are previously given when designing optical interconnection. That is, to connect a lot of optical systems in parallel by using the optical system in FIG. 1, there is a request value for design on the interconnection interval between the optical systems and $\omega_2$ is determined in accordance with the request value. Moreover, $\omega_4$ is determined in accordance with the degree of the influence of a positional deviation of a light source to be relaxed by the optical interconnection. Resultingly, $\omega_3$ serves as a free parameter and the interconnection length L can be regarded as a function using $\omega_3$ as a parameter. Therefore, as commonly known, $\omega_3$ for providing the maximum interconnection length Lmax by partially differentiating the interconnection length L about the beam waist $\omega_3$ of the intermediate image is obtained from the following expression (2).

$$\omega_3 = \frac{\omega_2 \omega_4}{\sqrt{\omega_2^2 + \omega_4^2}} \quad (2)$$

According to the expressions (1) and (2), the maximum interconnection length Lmax corresponding to the $\omega_3$ is provided by the following expression (3).

$$L_2 + L_3 = \frac{\pi}{\lambda}\omega_2\omega_4 \qquad (3)$$

From the expression (3), it is understood that a interconnection length is determined by the effective beam radiuses $\omega_2$ and $\omega_4$ of the two imaging lenses 10 and 12 under the condition of the maximum interconnection length Lmax. Moreover, in the case of the present invention, it is understood that an interconnection length (Lmax=constant) similar to the case of an equimultiple can be realized by increasing $\omega_2$ even if the ratio between two effective beam radiuses is changed, that is, $\omega_4$, for example, is decreased.

Moreover, when the $\omega_3$ is determined, it is possible to obtain the focal length $f_1$ of the first imaging lens 10 and the focal length $f_2$ of the second imaging lens 12 on the basis of the relation between the beam waists $\omega_1$ and $\omega_5$ in the light source s and photodetector d one hand and the beam waist $\omega_3$ in the intermediate image on the other. The forcal lengths $f_1$ and $f_2$ are obtained by using a ray matrix from the following expression (4). The beam waist $\omega_3$ is realized by the obtained focal length $f_1$. The intermediate image is imaged to the image radius (beam waist) $\omega_5$ on the light receiving plane of the designated photodetector d.

$$\begin{cases} f_1 = \frac{\pi\omega_1\omega_3}{\lambda(\omega_3^2 - \omega_1^2)}\left[\omega_3\sqrt{\omega_2^2 - \omega_1^2} - \omega_1\sqrt{\omega_2^2 - \omega_3^2}\right] \\ f_2 = \frac{\pi\omega_3\omega_5}{\lambda(\omega_5^2 - \omega_3^2)}\left[\omega_5\sqrt{\omega_4^2 - \omega_3^2} - \omega_3\sqrt{\omega_4^2 - \omega_5^2}\right] \end{cases} \qquad (4)$$

Thus, it is understood that the microoptical system of the present invention has a series of relations provided by the expressions (1) to (4). Therefore, to design the microoptical system, the maximum interconnection length Lmax is first provided as a requisite. The beam waists $\omega_1$ and $\omega_5$ of the light source s and the photodetector d are predetermined values. Moreover, as already described, it is possible to determine $\omega_2$ in accordance with request values for interconnection intervals requested to connect, in parallel, many optical systems to be optically interconnected between the light source s and the photodetector d one to one by using a set of first and second imaging lenses and determine $\omega_4$ in accordance with a level in which the influence of a light-source deviation should be relaxed by the optical interconnection. These two effective beam radiuses $\omega_2$ and $\omega_4$ can be determined by the expression (3) by considering which values the request values for interconnection intervals should be set to and which level the positional-deviation relaxing level should be set to. Moreover, a wavelength $\lambda$ to be used is determined according to the light source.

By substituting the values thus determined for the expressions (1) and (4), it is possible to obtain the corresponding distances $L_1$ to $L_4$ and focal lengths $f_1$ and $f_2$. Therefore, the designed locations of the light source s, first imaging lens 10, second imaging lens 12, and photodetector d which are components of the microoptical system of the present invention are determined. Thus, it is possible to set these components to their corresponding locations.

To set the components, it is necessary to consider how to determine the two effective beam radiuses $\omega_2$ and $\omega_4$. From the expression (3), it is found that the maximum interconnection length Lmax makes it possible to select an infinite number of sets of values of the two effective beam radiuses $\omega_2$ and $\omega_4$. The above-described interconnection interval, that is, the distance between adjacent imaging lenses and the light-source positional-deviation-error relaxing level are requisites for limiting the number of the sets. Therefore, in the case of the present invention, $\omega_4$ is set smaller than $\omega_2$ in order to increase the tolerance of positioning errors (misalignment). At the same time, it is possible to maintain the combination length same as that of a conventional equimultiple Gaussian optical system by selecting the ratio between $\omega_4$ and $\omega_2$ in accordance with the expression (3).

[Description of Influences Due to Light-Source Positional Deviation]

The light-source positional deviation includes a positional deviation in the optical-axis direction and a positional deviation in the direction vertical to the optical axis. Therefore, it is described below that the combination light loss due to a positioning error (misalignment) of the light source s is improved by considering these positional deviations separately and setting the effective beam radius $\omega_4$ of the second imaging lens smaller than the effective beam radius $\omega_2$ of the first imaging lens 10 in a Gaussian beam combination system used for the present invention.

(I) Influences due to deviation ($\alpha$) of light source in optical-axis direction In FIG. 1, it is assumed that z axis of the Cartesian coordinates consisting of x, y, and z axes is the optical axis. Moreover, in the case of the following embodiment, it is assumed as design conditions that, for example, the wavelength $\lambda$ of Gaussian beams is 1.3 $\mu$m, the beam waist $\omega_1$ of the light source s is 2 $\mu$m, the beam waist $\omega_5$ of the photodetector d is 5 $\mu$m, the effective beam radius $\omega_2$ of the first imaging lens 10 is 100 $\mu$m, the openings or apertures of the first and second imaging lenses are rectangular openings of 300 by 300 $\mu$m, and the opening of the photodetector is 15 by 15 $\mu$m in size.

Main influences due to a positional deviation in the optical-axis direction include a power truncation (or power loss) due to the effective beam radius $\omega_4$ of the second imaging lens 12 and a power truncation due to a mismatch between the beam waist $\omega_5$ of an image converted on a light receiving plane and the detector d. In any case, it is possible to quantitatively evaluate influences due to a positional deviation in accordance with the amount of light (or optical power or luminous energy) to be truncated (intensity of light entering the detector surface or equivalent amount of light corresponding to the light intensity) by the second imaging lens 12 and on the detector surface by using a ray matrix.

The ratio $\omega_4/\omega_2$ (this ratio is hereafter also referred to as beam spot reduction rate) is determined by using the expression (3) in accordance with the above-described design conditions and the tentatively-determined maximum interconnection length Lmax and $\omega_3$ is determined by using the expression (3) in accordance with these values. Then, the distances $L_1$ to $L_4$ and $f_1$ and $f_2$ are obtained by substituting the values $\omega_1$ to $\omega_5$ for the expressions (1) and (4) to form a designed microoptical system. In this case, a case is assumed in which a light source on a position determined by the designed optical system which is the reference position (assumed as the reference point on z axis) is deviated by a deviation value $\alpha$ ($\mu$m) in the positive or negative direction on the optical axis (z axis). It is assumed that the distance $L_1$ between the light source s and the first imaging lens 10 decreases when $\alpha$ is a negative value and the distance $L_1$ increases when $\alpha$ is a positive value. When the light source s deviates by $\alpha$ in the optical-axis direction, the effective beam radius on the second imaging lens 12 changes. This changed effective beam radius is referred to as a "beam radius due to deviation".

The beam waist $\omega_3$ of an intermediate image and the distances $L_2$ and $L_3$ between the intermediate image on one hand and two imaging lenses on the other are respectively changed to $\omega_3'$ and $L_2'$ and $L_3'$ due to the deviation $\alpha$ of the light source s in the optical-axis direction as shown in the following expression (5).

$$\omega_3' = \frac{\omega_1}{\sqrt{\frac{\pi^2 \omega_1^4}{\lambda^2 f_1^2} + \left(1 - \frac{L_1 + \alpha}{f_1}\right)^2}} \quad (5)$$

$$L_2' = \frac{\frac{\pi^2 \omega_1^4}{\lambda^2 f_1} + \frac{(L_1+\alpha)(L_1+\alpha-f_1)}{f_1}}{\frac{\pi^2 \omega_1^4}{\lambda^2 f_1} + \frac{(L_1+\alpha-f_1)^2}{f_1^2}}$$

$$L_3' = L_2 + L_3 - L_2'$$

As a result, the "beam radius due to deviation" $\omega_4'$ comes to the value provided by the following expression (6).

$$\omega_4' = \omega_3' \sqrt{1 + \left(\frac{\lambda L_3'}{\pi \omega_3'^2}\right)^2} \quad (6)$$

Then, amount of light $P_1$ is considered which can be transmitted through the effective area of the second imaging lens 12. The amount of light $P_1$ is a value obtained by squaring the electric field distribution of Gaussian beams, which is a value equivalent to the intensity of light entering the effective area of a lens (the effective opening of a lens is handles as a square by considering that lenses are two-dimensionally arranged on a practical system). The luminous energy $P_1$ can be obtained by surface-integrating the Gaussian distribution on the effective area of a lens. The following expression (7) is used in this case.

$$P_1 = \frac{2}{\pi \omega_4'^2} \iint_{\text{second imaging lens}} \exp\left(-2x^2 + \frac{y^2}{\omega_4'^2}\right) dx\, dy \quad (7)$$

Figure 2:
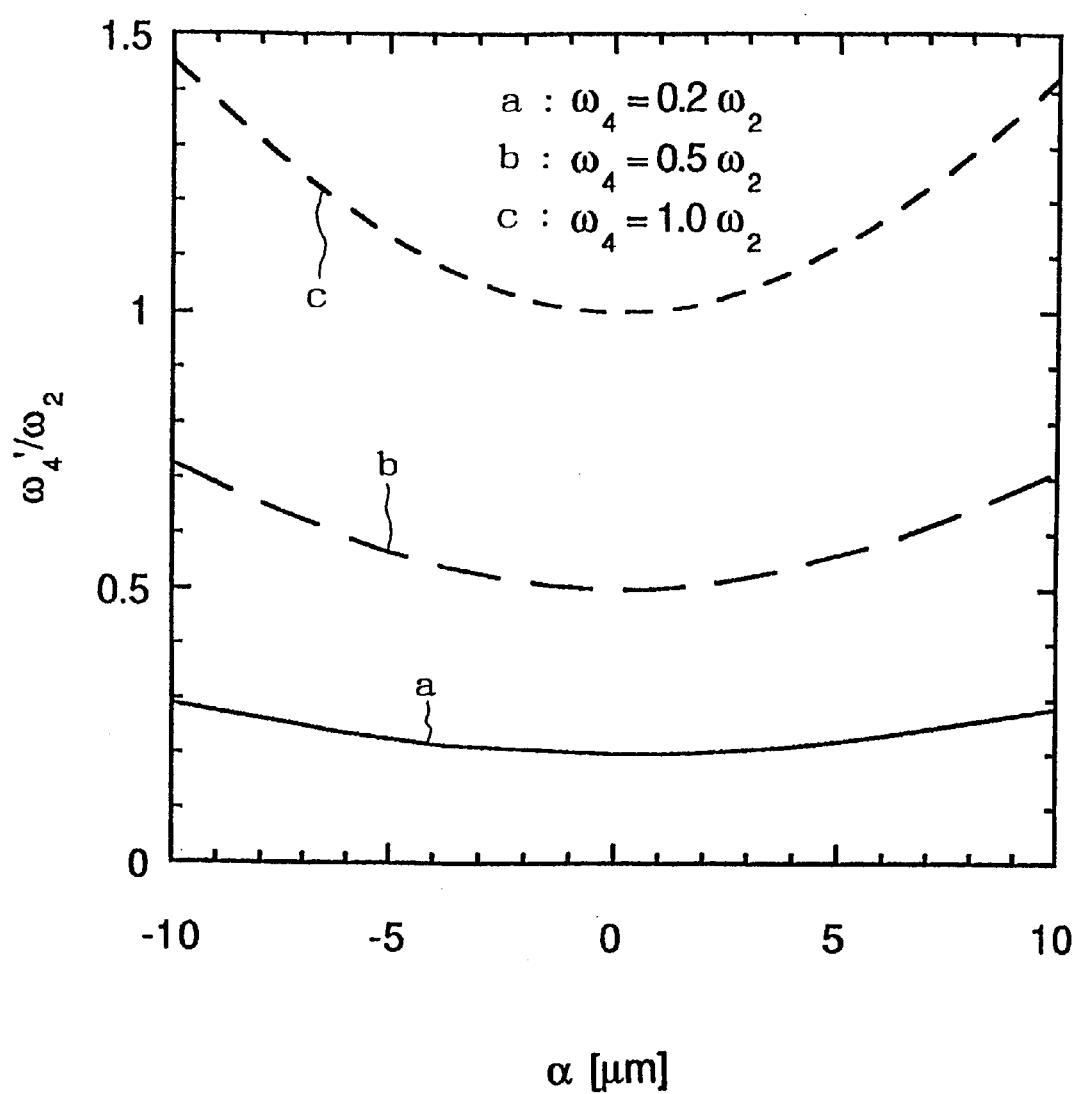
FIG. 2 is an illustration showing the relation between deviation $\alpha$ of a light source in its optical axis direction and beam radius ratio ($\omega_4'/\omega_2$) on a second imaging lens.

In FIG. 2, by assuming three set ratios $\omega_4/\omega_2$ on the designed values of $\omega_2$ and $\omega_4$, a parameter is assigned to horizontal axis or abscissa as the deviation $\alpha$ and the result of calculating the value of the ratio ($\omega_4'/\omega_2$) between the "beam radius due to deviation" $\omega_4'$ on the second imaging lens 12 and $\omega_2$ as the beam radius ratio $\omega_4'/\omega_2$) on the second imaging lens is assigned to vertical axis or ordinate. In this case, $\omega_4'$ is calculated by using the expression (6). In FIG. 2, the curve a shows the case of $\omega_4=0.2\omega_2$, the curve b shows the case of $\omega_4=0.50\omega_2$, and the curve c shows the case of $\omega_4=1.0\omega_2$ respectively.

From the results shown in FIG. 2, it is found that the absolute value of the deviation $\alpha$ from the reference position gradually becomes larger than the value ($\omega_4'/\omega_2$) at the reference position increases (that is, the beam radius $\omega_4'$ due to the deviation increases) as the absolute value increases and moreover, the beam radius ratio $\omega_4'/\omega_2$) changes almost symmetrically in positive and negative directions. Moreover, it is found that the beam radius ratio ($\omega_4'/\omega_2$) becomes a small value as a whole as the contraction rate decreases in order of c, b, and a. That is, in the case of the curve a, the beam radius is approx. 0.2 when $\alpha=0$ $\mu$m and approx. 0.3 when $\alpha=\pm 10$ $\mu$m. In the case of the curve b, the beam radius ratio is approx. 0.5 when $\alpha=0$ and approx. 0.7 when $\alpha=\pm 10$ $\mu$m. In the case of the curve c, the beam radius ratio is approx. 1.0 when $\alpha=0$ $\mu$m and approx. 1.4 to 1.5 when $\alpha=\pm 10$ $\mu$m.

Figure 3A:
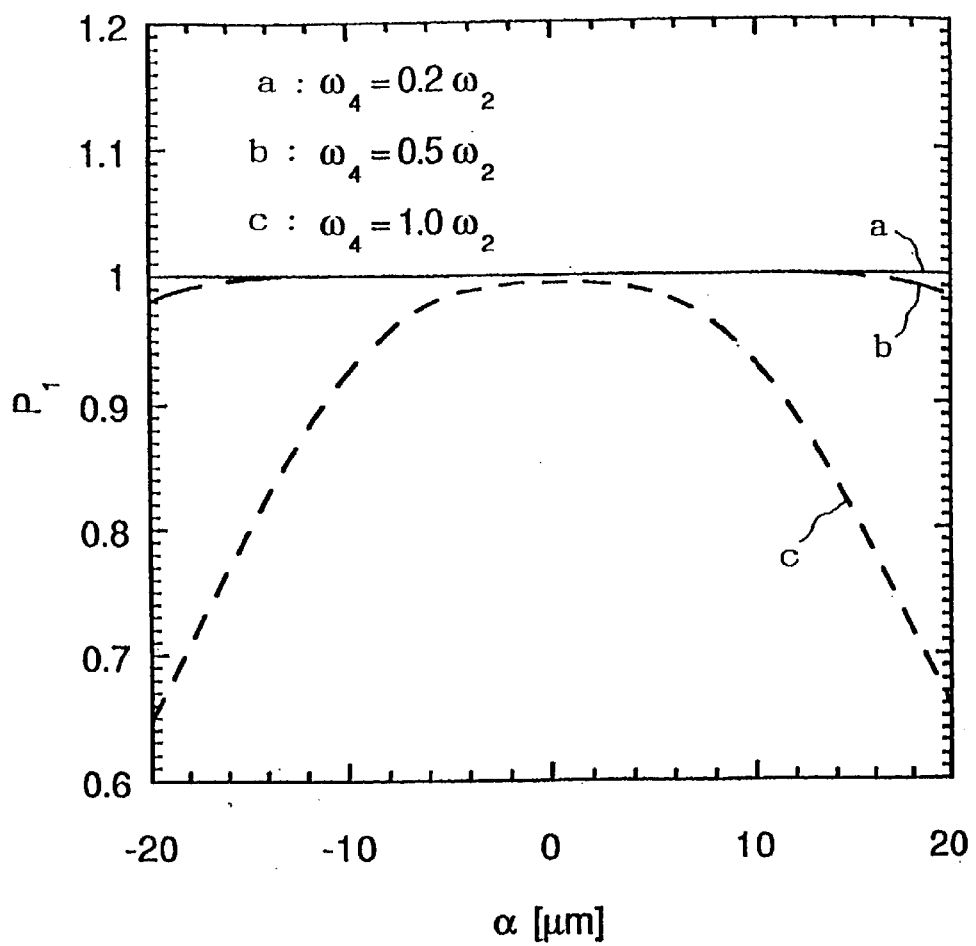
FIG. 3(A) is an illustration showing the relation between the deviation $\alpha$ of a light source in its optical axis direction and the light intensity $P_1$ transmitted by a second imaging lens and FIG. 3(B) is an illustration for explaining the relation between the size of the opening (or aperture) of a second imaging lens and the beam radius due to the deviation.

FIG. 3(A) shows the result of obtaining the amount of light (or optical power or luminous energy) $P_1$ based on the expression (7) by calculating a parameter as the deviation $\alpha$ on each of three set designed ratios ($\omega_4/\omega_2$). In FIG. 3(A), the deviation $\alpha$ is assigned to horizontal axis and the light intensity (transmitted amount of light) $P_1$ transmitting the second imaging lens 12 is assigned to vertical axis. In the case of the beam spot reduction ratio, similarly to the case of FIG. 2, the curve a shows the case of $\omega_4=0.2\omega_2$, the curve b shows the case of $\omega_4=0.5\omega_2$, and the curve c shows the case of $\omega_4=1.0\omega_2$ respectively. From FIG. 3(A), it is found that the curves a, b, and c almost symmetrically change when the absolute values increase from the level of $\alpha=0$ $\mu$m. When $\alpha=0$ $\mu$m, it is found that the light intensity $P_1$ of each of the curves a, b, and c reaches 1.0 or a value nearby 1.0. When $\alpha=\pm 20$ $\mu$m, $P_1$ is 1.0 in the case of the curve a, approx. 0.98 in the case of the curve b, and approx. 0.65 in the case of the curve c.

Figure 3B:
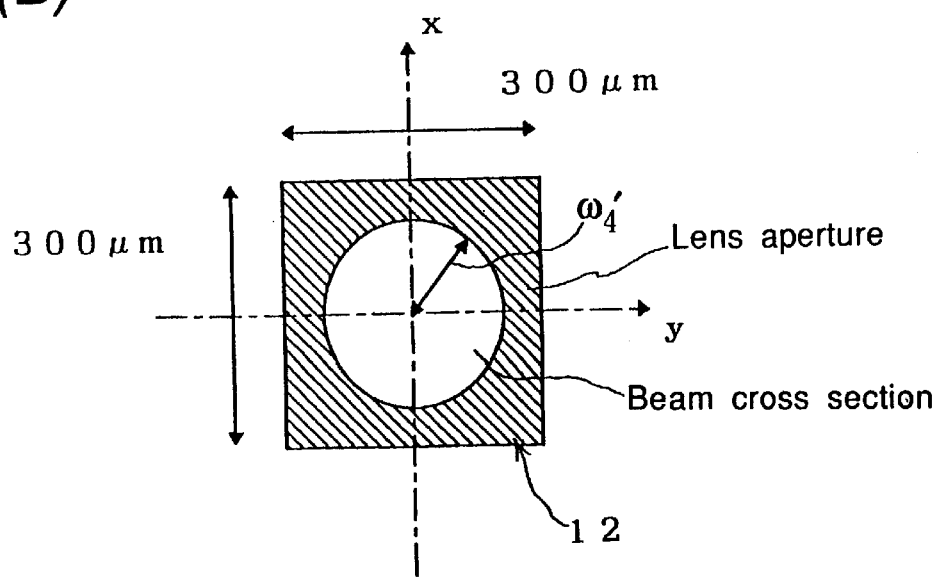

FIG. 3(B) is an illustration showing the relation between the size of the aperture or opening of the second imaging lens 12 and the "beam radius $\omega_4'$ due to deviation". The beam radius $\omega_4'$ is a value which can be obtained from the expression (6). FIG. 3 shows that the light source is present on the origin of xy coordinates, that is, z axis (optical axis) even if it deviates in the optical-axis direction. The beam radius $\omega_4'$ decreases in order of the curves c, b, and a.

From FIGS. 3(A) and 3(B), it is found that the amount of light loss (or optical power loss or the luminous energy loss) due to a deviation of a light source in the optical axis direction is improved by decreasing the beam radius on the surface of the second lens 12. Moreover, it is found that the light intensity $P_1$ changes only up to a level in which the amount of light loss can be ignored even if the deviation $\alpha$ is 20 $\mu$m by halving the ratio between beam radiuses on the surface of the second lens 12 for the curve c (in the case of the curve b).

Then, the influence on the light receiving plane of the photodetector d when the light source deviates by $\alpha$ in the optical axis direction is considered below. When the light source deviates, the beam waist $\omega_5$ shifts to a position deviated from the surface of the photodetector. As a result, a new beam waist $\omega_5''$ and a distance $L_4'$ from the second combination lens are obtained from the following expression (8).

$$\omega_5'' = \frac{\omega_3'}{\sqrt{\frac{\pi^2 \omega_3'^4}{\lambda^2 f_2^2} + \left(1 - \frac{L_3'}{f_2}\right)^2}} \quad (8)$$

$$L_4' = \frac{\frac{\pi^2 \omega_3'^4}{\lambda^2 f_2} + \frac{L_3'(L_3' - f_2)}{f_2}}{\frac{\pi^2 \omega_3'^4}{\lambda^2 f_2^2} + \frac{(L_3' - f_2)^2}{f_2^2}}$$

By using the expression (8), a beam radius considering the deviation of the light source s in the optical axis direction, that is, a "beam radius on light receiving plane due to deviation" $\omega_5'$ is shown by the following expression (9) in the case of this embodiment.

$$\omega_5' = \omega_5'' \sqrt{1 + \left[\frac{\lambda(L_4 - L_4')}{\pi \omega_5''^2}\right]^2} \quad (9)$$

Amount of light $P_2$ received by the photodetector (also referred to as a detector) d is obtained by surface-integrating the Gaussian distribution of beams on the effective area of the light receiving plane of the photodetector {the light receiving plane is handled as a square similarly to the case of the expression (7)} and shown by the following expression (10) in the case of this embodiment.

$$P_2 = \frac{2}{\pi \omega_5'^2} \int\int_{\text{detector}} \exp\left(-2x^2 + \frac{y^2}{\omega_5'^2}\right) dx\, dy \quad (10)$$

Also in this case, the already described design conditions are assumed and moreover, how the beam radius $\omega_5'$ on the light receiving plane due to deviation of the light source in the optical axis direction changes to the designed $\omega_5$ on the already-described three designed beam spot reduction ratios $(\omega_4/\omega_2)$ and the change of the amount of light (or optical power or luminous energy) $P_2$ are studied.

Figure 4:
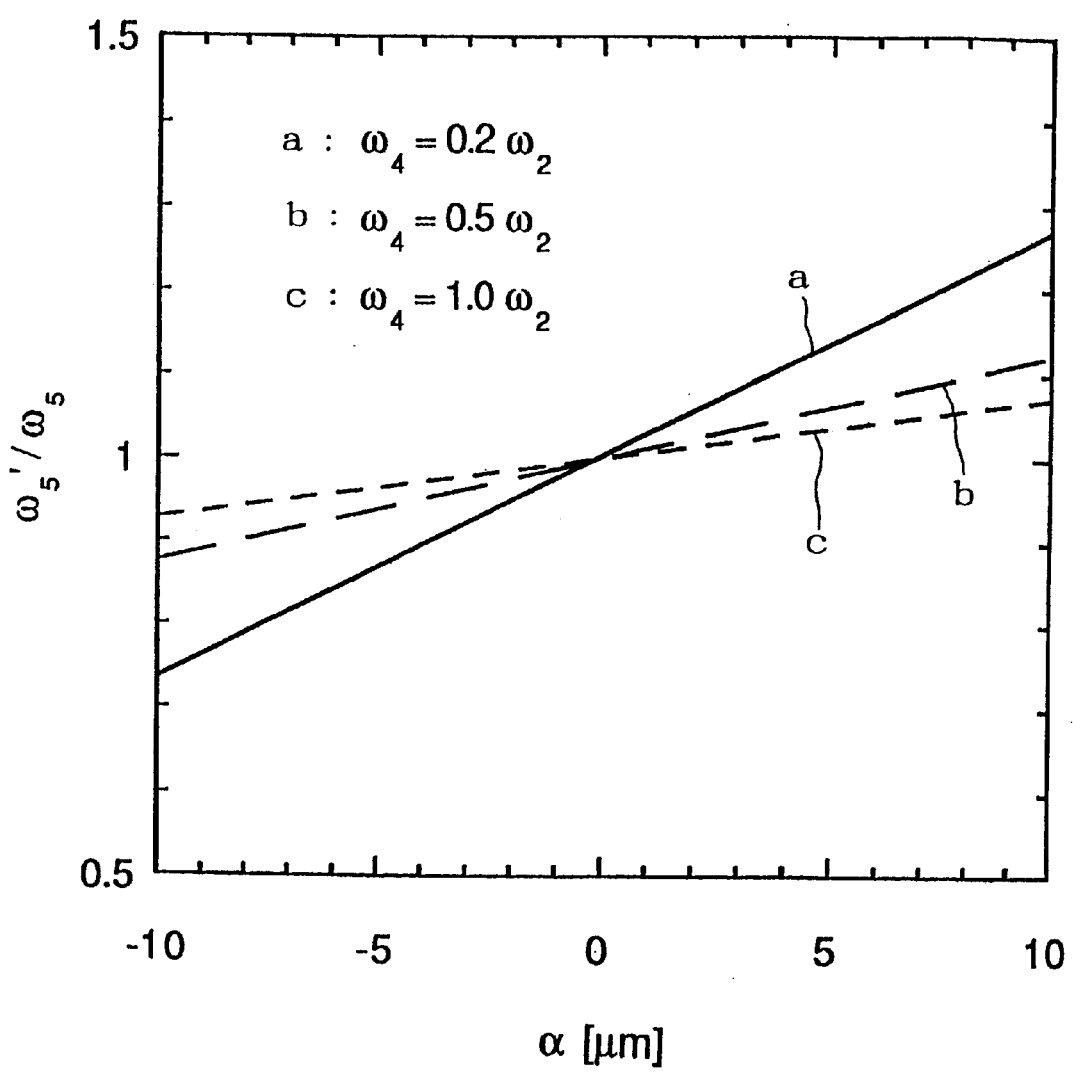
FIG. 4 is an illustration showing the relation between deviation $\alpha$ of a light source in its optical axis direction and the beam radius ratio ($\omega_5'/\omega_5$) on a photodetector.

In FIG. 4, straight lines a, b, and c are obtained by assigning the deviation $\alpha$ ($\mu$m) of the light source s in the optical axis direction to horizontal axis and the beam radius ratio $(\omega_5'/\omega_5)$ of the photodetector (detector) d to vertical axis and thereby, showing the change of the beam radius of the photodetector to the deviation of the light source in the optical axis direction. From FIG. 4, it is found that the beam radius linearly changes when the light source s deviates in the optical axis direction.

When it is assumed that $\alpha$ is changed from 0 $\mu$m to $-10$ $\mu$m and up to $+10$ $\mu$m at the reference position, the beam radius ratio has a value of approx. 0.74 at $-10$ $\mu$m, a value of approx. of 1.26 at $+10$ $\mu$m, and a value of 1.0 at the reference position in the case of the straight line a. Similarly, in the case of the straight line b, the beam radius ratio has a value of approx. 0.88 when $\alpha=-10$ $\mu$m, a value of 1.0 at the reference position, and a value of approx. 1.12 at $+10$ $\mu$m. Moreover, in the case of the straight line c, the beam radius ratio has a value of approx. 0.93 when $\alpha=-10$ $\mu$m and a value of approx. 1.07 when $\alpha=+10$ $\mu$m though the beam radius ratio is 1.0 at the reference position.

Thus, it is represented that the change value of the beam radius increases as the beam spot reduction ratio of the beam radius of the second imaging lens 12 increases. That is, it is found that a focused Gaussian beam has a larger beam-radius change due to deviation of a light source contrary to the same characteristic of the second imaging lens 12.

Figure 5A:
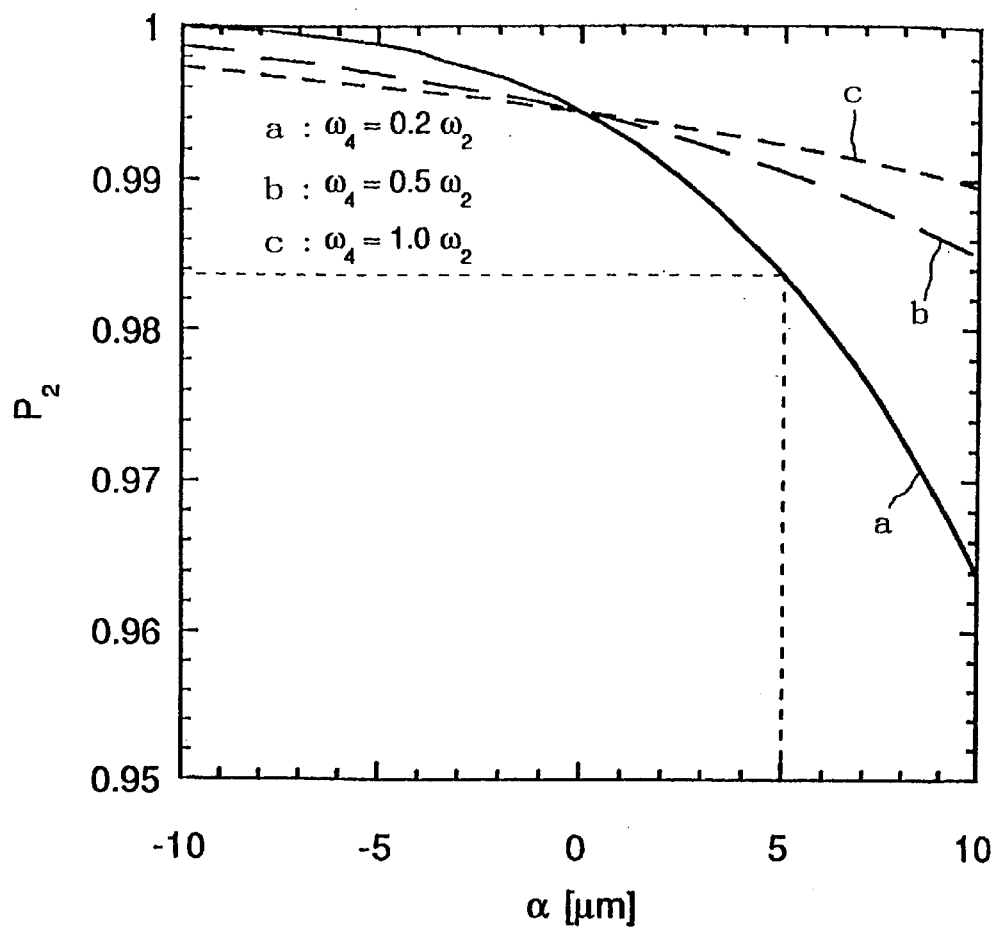
FIG. 5(A) is an illustration showing the relation between the deviation $\alpha$ of a light source in its optical axis direction and the amount of light $P_2$ received by the light receiving plane of a photodetector and FIG. 5(B) is an illustration for explaining the relation between the size of the light receiving plane of the photodetector and the beam radius due to the deviation.
Figure 5B:
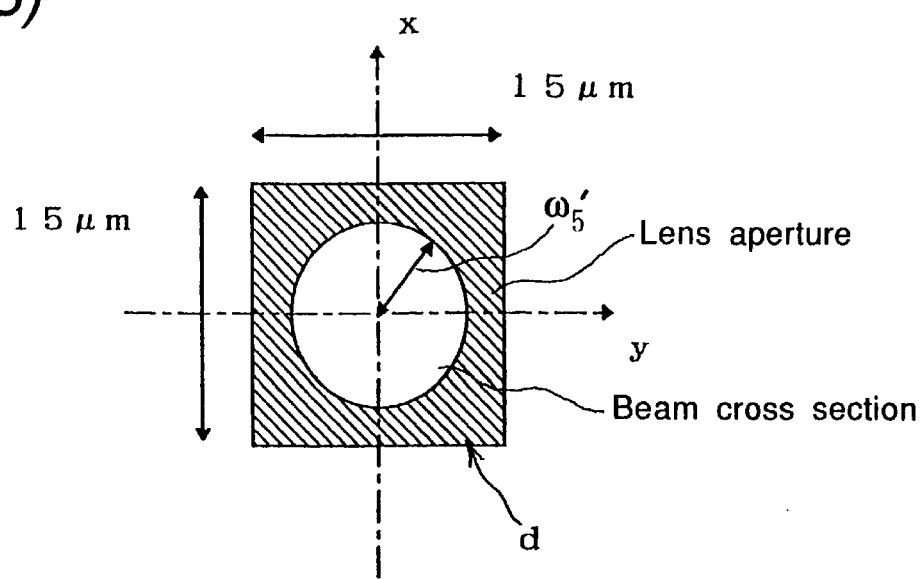

Moreover, FIGS. 5(A) and 5(B) are illustrations same as FIGS. 3(A) and 3(B), showing the change of received amount of light due to the change of the beam radius shown in FIG. 4. In the case of FIG. 5 (A), the deviation $\alpha$ ($\mu$m) of the light source s in the optical axis direction is assigned to horizontal axis and the amount of light (or optical power or luminous energy) $P_2$ received by the detector d is assigned to vertical axis. FIG. 5(B) shows the relation between the size of the light receiving plane of the detector d and the beam radius $\omega_5'$ on the light receiving plane. The beam radius $\omega_5'$ is obtained from the expression (9). Similarly to the case of FIG. 3, FIG. 5 shows that the light source is present on the origin of the xy coordinates, that is, on z axis (optical axis) even if the light source deviates in the optical axis direction. In FIG. 5, when, for example, $\alpha$ is changed from 0 $\mu$m at the reference position up to $-10$ $\mu$m and $+10$ $\mu$m similarly to the case of the description in FIG. 4, it is found that $P_2$ changes from approx. 1 ($\alpha=-10$ $\mu$m) to approx. 0.994 ($\alpha=0$ $\mu$m) and finally changes to approx. 0.964 ($\alpha=10$ $\mu$m) in the case of the curve a. In the case of the curve b, it is found that $P_2$ changes from approx. 0.999 ($\alpha=-10$ $\mu$m) to approx. 0.994 ($\alpha=0$ $\mu$m) and finally changes to approx. 0.985 ($\alpha=10$ $\mu$m). In the case of the curve c, it is found that $P_2$ changes from approx. 0.997 ($\alpha=-10$ $\mu$m) to approx. 0.994 ($\alpha=0$ $\mu$m) and finally changes to approx. 0.990 ($\alpha=10$ $\mu$m).

From the results shown in FIGS. 5(A) and 5(B), it is found that the received amount of light increases compared to the case in which the light source s does not deviate and the light receiving efficiency is improved because the beam radius on the light receiving plane decreases as the distance between the light source s and the first imaging lens 10 decreases ($\alpha<0$). However, when the distance between the light source s and the first imaging lens 10 increases, the beam radius on the light receiving plane increases and the light receiving loss becomes remarkable. For example, when the distance between the light source s and the first imaging lens 10 increases by 5 $\mu$m, it is found that the amount of light loss (or optical power loss or luminous energy loss) comes to approx. 2% because $P_2$ comes to approx. 0.984. However, as described later, it is found that the influence of the light source due to a deviation in the optical axis direction is so small that it can be ignored compared to the influence when the light source deviates in the direction vertical to the optical axis.

(II) Influences of light source due to deviation in direction vertical to optical axis.

In this section, it is studied how much the present invention can decrease amount of light loss when the light source s deviates by $\beta$ in the direction perpendicular to the optical axis from the reference point (x=0, y=0). Also in this case, the study is performed by using the design conditions used when studying the influences due to the deviation $\alpha$ in the optical axis direction and the three set contraction rates which are already described.

Deviation of the light source s in the direction perpendicular to the optical axis causes an angle deviation and a lateral-directional axis deviation of an incoming beam on the second imaging lens 12 and the light receiving plane of the photodetector d. This study assumes that a paraxial condition is effected and ignores the angle deviation of the light source.

When assuming the axis deviation of a beam on the surface of the second imaging lens as $\Delta x_1$ and the angle deviation of the beam as $\Delta \theta_1$ by using the ray matrix (ABCD matrix) from the light source s to the second imaging lens 12, it is found that the $\Delta x_1$ and $\Delta \theta_1$ are obtained from the following expression (11).

$$\begin{pmatrix} \Delta x_1 \\ \Delta \theta_1 \end{pmatrix} = \begin{pmatrix} 1 & L_2 + L_3 \\ 0 & 1 \end{pmatrix} \begin{pmatrix} 1 & 0 \\ -1/f_1 & 1 \end{pmatrix} \begin{pmatrix} 1 & L_1 \\ 0 & 1 \end{pmatrix} \begin{pmatrix} \beta \\ 0 \end{pmatrix} \quad (11)$$

$$= \begin{pmatrix} -\frac{\beta}{f_1}(L_2 + L_3 - f_1) \\ -\frac{\beta}{f_1} \end{pmatrix}$$

By using the expression (11), amount of light (or optical power or luminous energy) $P_3$ transmitting the surface of the second imaging lens 12 is obtained in accordance with the axis deviation vertical to the optical axis by surface-integrating the effective area of the lens surface.

$$P_3 = \frac{2}{\pi \omega_4^2} \iint_{\text{second imaging lens}} \exp\left[-2(x - \Delta x_1)^2 + \frac{y^2}{\omega_4^2}\right] dx\, dy \tag{12}$$

Figure 6:
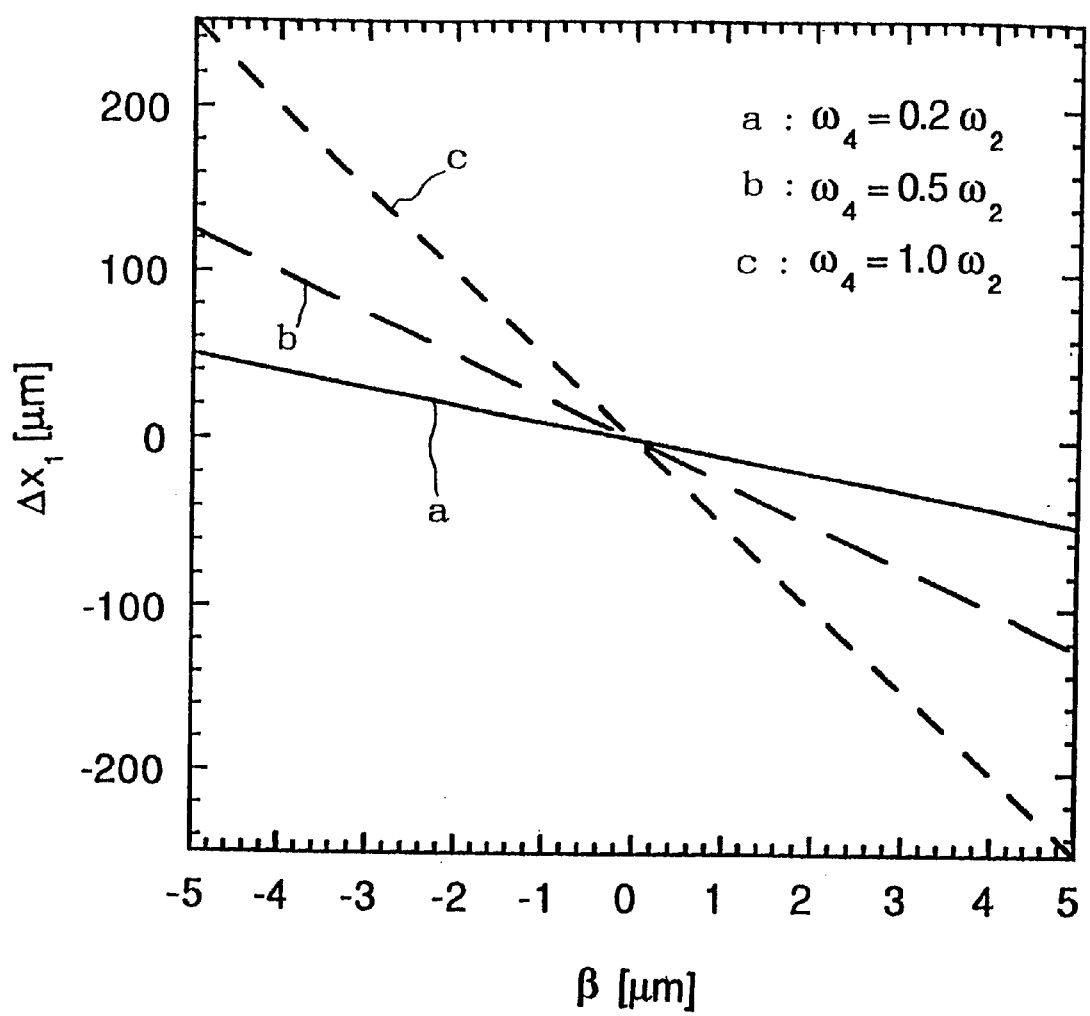
FIG. 6 is an illustration showing the relation between the deviation $\beta$ of a light source in the direction perpendicular to its optical axis and the beam shift $\Delta x_l$ on a second imaging lens.

FIG. 6 is an illustration showing the axis deviation of a Gaussian beam in the direction vertical to the optical axis direction of the beam on the surface of the second imaging lens 12 by using the deviation β of the light source s in the lateral direction of the light source as a parameter to different beam spot reduction ratios on the surface of the second imaging lens. Therefore, FIG. 6 is an illustration showing a calculated deviation of the central position of the beam when it is assumed that the light source s deviates by the deviation β (μm) in the direction vertical to its optical axis. The deviation β is assigned to horizontal axis and the beam shift $\Delta x_1$ (μm) on the second imaging lens is assigned to vertical axis.

According to the results in FIG. 6, the shift $\Delta x_1$ comes to approx. 50 μm, 0 μm, and approx. −50 μm when the deviation β changes from −5 μm to +5 μm centering around 0 μm in the case of the curve a. Similarly, in the case of the curve b, the shift comes to approx. 120 μm, approx. 0 μm, and approx. −120 μm correspondingly to the change of the same deviation. Moreover, in the case of the curve c, the shift comes to approx. 250 μm, 0 μm, and approx. −250 μm correspondingly to the change of the same deviation. Therefore, it is found that the change of the beam shift $\Delta x_1$ to the deviation β of the light source s becomes linear and influences of beam shift can be decreased as a beam spot reduction ratio decreases.

Figure 7A:
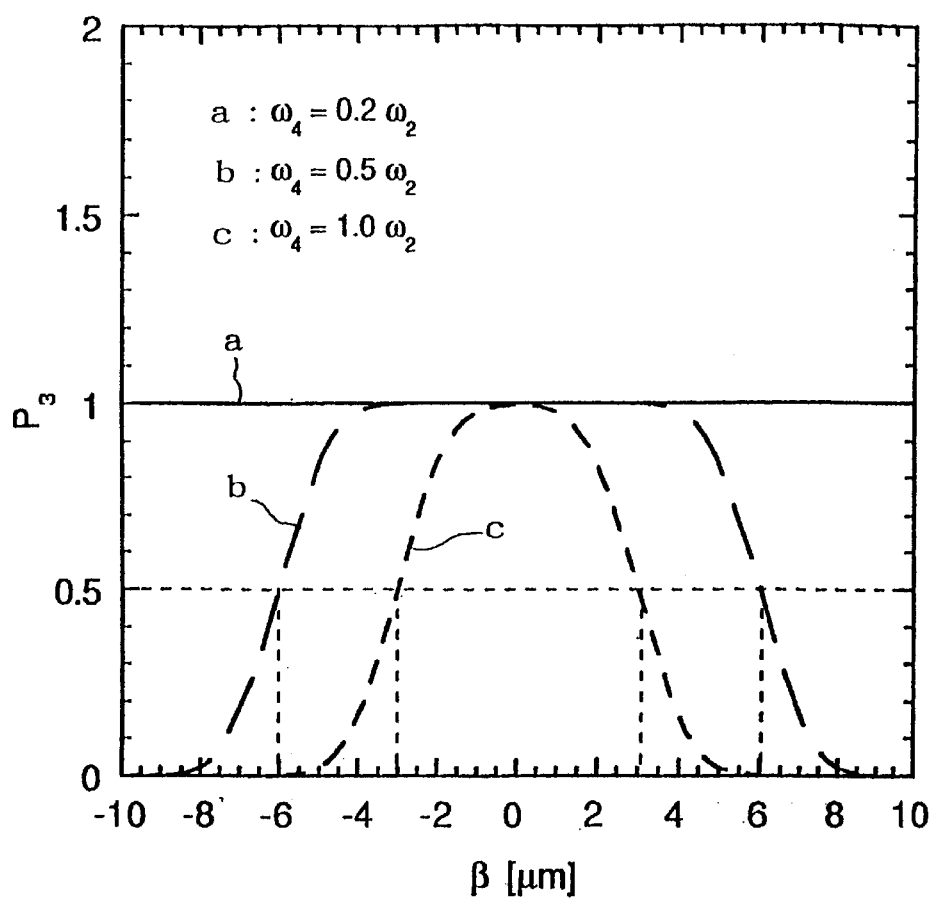
FIG. 7(A) is an illustration showing the relation between the deviation β of a light source in the direction perpendicular to its optical axis and the amount of light $P_3$ transmitted by a second imaging lens and FIG. 7(B) is an illustration for explaining the positional relation between the surface of the second imaging lens and the beam with a beam radius due to the deviation.

FIG. 7(A) shows the result of calculating the amount of light $P_3$ transmitted by the second imaging lens 12 when the light source s deviates by the deviation β from its optical axis by using the expression (12). The amount of light $P_3$ is the transmitted amount of light of the second imaging lens 12 to be changed due to the beam shift shown in FIG. 6. In FIG. 7(A), the deviation β (μm) is assigned to horizontal axis and the amount of light $P_3$ is assigned to vertical axis.

From FIG. 7(A), it is found that, when changing β from −10 μm to +10 μm centering around 0 μm, $P_3$ maintains a value of approx. 1 without causing a change corresponding to the change of the β in the case of the curve a and $P_3$ is almost constant and kept at a value of 1 when β ranges between approx. −4 μm and approx. +4 μm in the case of the curve b, but $P_3$ suddenly decreases when β is less than −4 μm and comes to approx. 0.5 when β is −6 μm and approx. 0 when β is approx. −8 μm. However, when β exceeds +4 μm, it is found that $P_3$ suddenly decreases and comes to approx. 0.5 when β is 6 μm and approx. 0 when β is approx. 8 μm. Moreover, in the case of the curve c, it is found that $P_3$ is approx. 1 when the deviation B is 0 μm but $P_3$ comes to 0.5 when β is approx. ±3 μm and 0 when β is approx. ±5 μm. Therefore, it is possible to decrease the influences on the equivalent amount of light $P_3$ when deviating the light source in the direction vertical to its optical axis by the deviation β by decreasing the beam radius on the surface of the second imaging lens 12, that is, by decreasing the value of $\omega_4/\omega_2$. For example, by having the beam radius on the surface of the second imaging lens 12 ($\omega_4/\omega_2$=0.5: corresponding to the curve b), it is possible to improve the range of the vertical light-source deviation causing an amount of light loss (or optical power loss or luminous energy loss) of 50% from ±3 μm to ±6 μm. Therefore, it is found that the tolerance of a lateral-directional positional deviation of a light source to its optical axis increases by using a focused Gaussian beam.

Figure 7B:
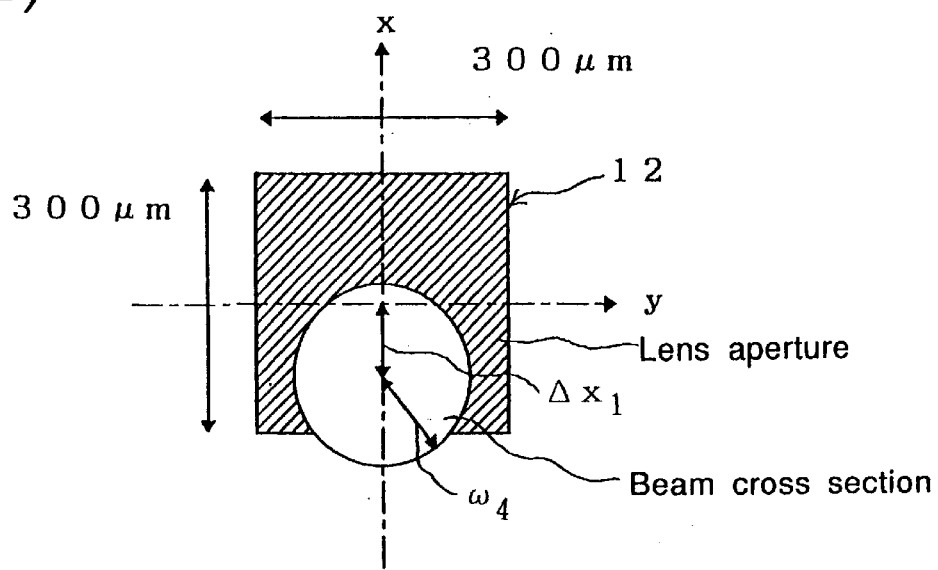

FIG. 7(B) shows how far the center of a beam deviates from the optical axis (z axis) of the light source s on the surface of the second imaging lens 12 when the light source s deviates in the direction perpendicular to its optical axis like the case of FIG. 7(A). It is found in this example that the center of the optical axis shifts downward along x axis.

Then, influences of the deviation β on the light receiving plane of the photodetector d are studied below. In the case of this embodiment, an axis deviation $\Delta x_2$ and an angle deviation $\Delta \theta_2$ on the light receiving plane can be obtained from the following expression (13) by using a ray matrix (ABCD matrix) similarly to the case of the study on the deviation α in the optical axis direction.

$$\begin{pmatrix} \Delta x_2 \\ \Delta \theta_2 \end{pmatrix} = \begin{pmatrix} 1 & L_4 \\ 0 & 1 \end{pmatrix} \begin{pmatrix} 1 & 0 \\ -1/f_2 & 1 \end{pmatrix} \begin{pmatrix} \Delta x_1 \\ \Delta \theta_1 \end{pmatrix} \tag{13}$$

$$= \begin{pmatrix} \frac{\beta}{f_1 f_2}[f_1 f_2 + (L_2 + L_3)(L_4 - f_2) - L_4(f_1 + f_2)] \\ \frac{\beta}{f_1 f_2}(L_2 + L_3 - f_1 - f_2) \end{pmatrix}$$

Values $\Delta x_1$ and $\Delta \theta_1$ in this expression are already obtained in the expression (11).

Amount of light entering the light receiving plane of a detector due to the axis deviation in the direction vertical to an optical axis expressed by the expression (13) has a value obtained from the following expression (14) by surface-integrating the effective area of the light receiving plane.

$$P_4 = \frac{2}{\pi \omega_5^2} \iint_{\text{detector}} \exp\left[-2(x - \Delta x_2)^2 + \frac{y^2}{\omega_5^2}\right] dx\, dy \tag{14}$$

Figure 8:
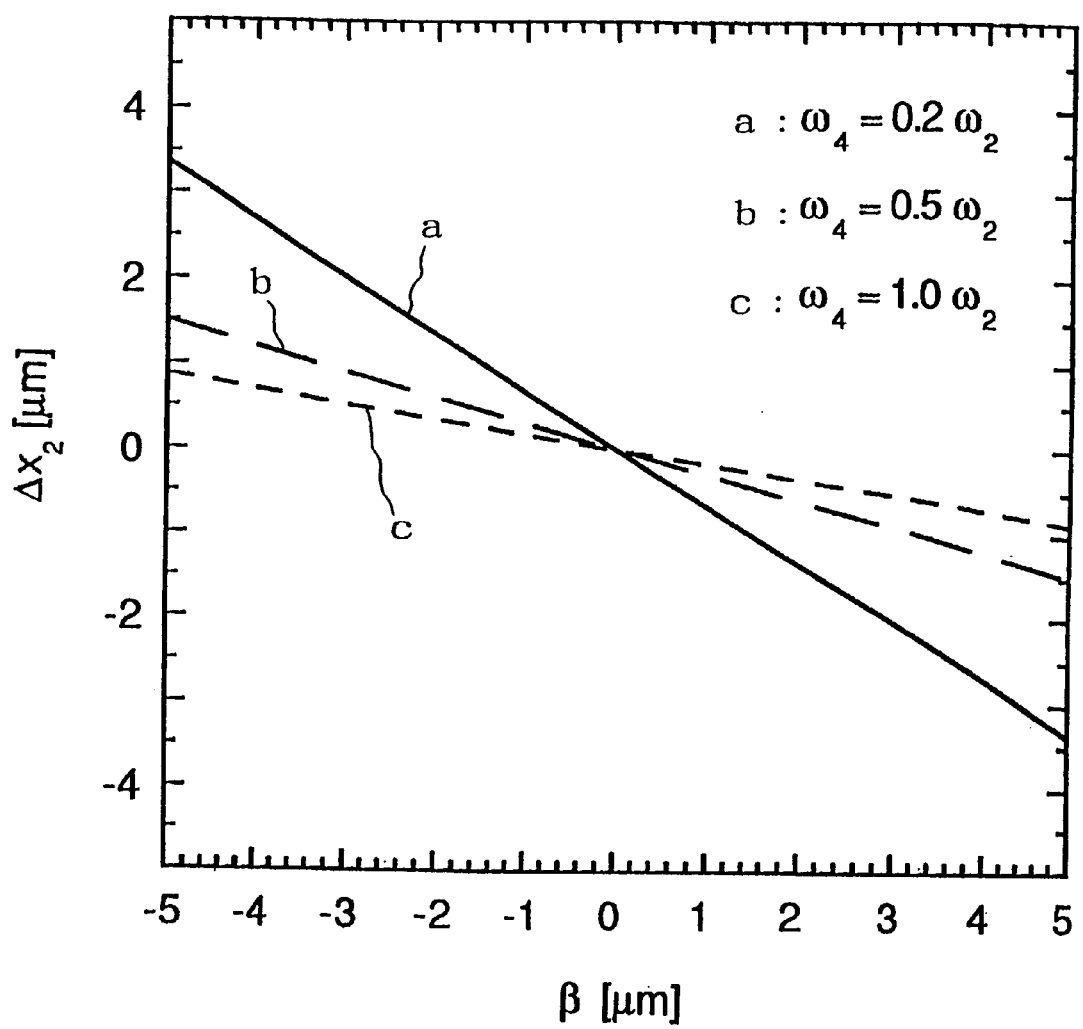
FIG. 8 is an illustration showing the relation between the deviation β of a light source in the direction perpendicular to its optical axis and the beam shift $\Delta x_2$ on the light receiving plane of a photodetector.

FIG. 8 is an illustration showing the relation between the deviation β and the beam shift $\Delta x_2$ obtained about three set beam spot reduction ratios similarly to FIG. 6 and showing the change of a beam shift on the light receiving plane due to a deviation in the direction perpendicular to the optical axis of a light source. In FIG. 8, the deviation β (μm) is assigned to horizontal axis and the beam shift $\Delta x_1$ (μm) on the light receiving plane is assigned to vertical axis. From curves a, b, and c in FIG. 8, it is found that the shift $\Delta x_2$ when changing β up to ±5 μm centering around 0 μm linearly changes in a range of approx. ±3.4 μm by passing through the central value 0 in the case of the curve a, linearly changes in a range of approx. ±1.5 μm by passing through the central value 0 in the case of the curve b, and linearly changes in a range of approx. ±0.9 μm by passing through the central value 0 in the case of the curve c. Therefore, it is found that the beam shift on the light receiving plane linear changes to the deviation β of the optical axis and increases by decreasing the beam spot reduction ratio on the second imaging lens 12, that is, decreasing $\omega_4/\omega_2$ differently from the relation for the beam shift on the surface of the second imaging lens 12.

Figure 9A:
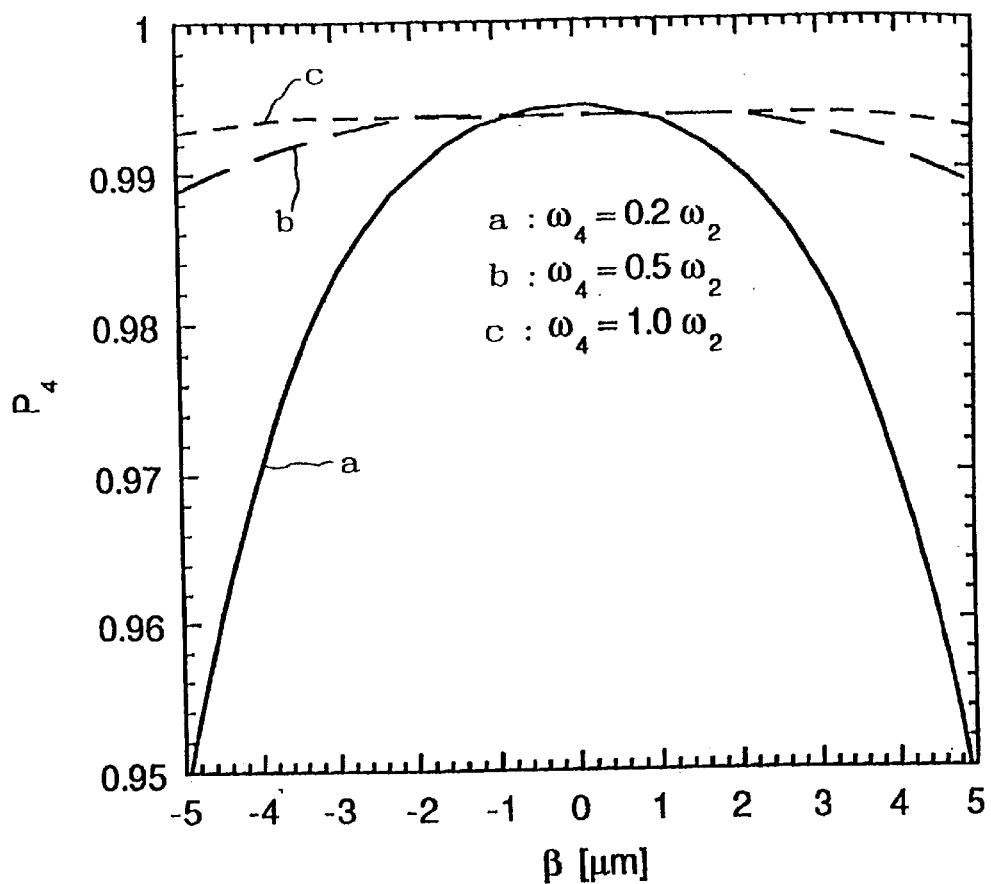
FIG. 9(A) is an illustration showing the relation between the deviation β of a light source in the direction perpendicular to its optical axis and the amount of light $P_4$ received by a photodetector and FIG. 9(B) is an illustration for explaining the positional relation between the light receiving plane of the photodetector and the beam with a beam radius due to the deviation.

FIG. 9(A) is an illustration showing values obtained by calculating the corresponding amount of light (or optical power or luminous energy) in accordance with the beam shift in FIG. 8 and showing the relation between the deviation β of the light source s in the direction vertical to its optical axis and incoming amount of light of beams received by the light receiving plane, that is, amount of light $P_4$. In FIG. 9(A), the deviation β (μm) is assigned to horizontal axis and the amount of light $P_4$ is assigned to vertical axis.

From FIG. 9(A), it is found that, by changing β in a range of ±5 μm centering around 0 μm, the amount of light $P_4$ has the maximum value when β is 0 μm in the case of the curve a and changes in a range between approx. 0.994 and the minimum value of 0.95, similarly changes between the maximum value of 0.994 and the minimum value of 0.989 in the case of the curve b, and continuously decreases from the maximum value of 0.994 up to the minimum value of 0.993 in the case of the curve c.

Therefore, from FIG. 9(A), it is found that the tolerance of the received amount of light $P_4$ decreases correspondingly to the deviation β by increasing the beam spot reduation ratio of the beam radius (from the curve c to the curve a). However, it is found that the decrease of the tolerance is up to approx. 5% in the range of the change of the deviation β. Moreover, though a focused Gaussian beam is more sensitive to a lateral deviation of a light source, it is possible to select an optimum condition by properly selecting a beam spot reduction ratio.

Figure 9B:
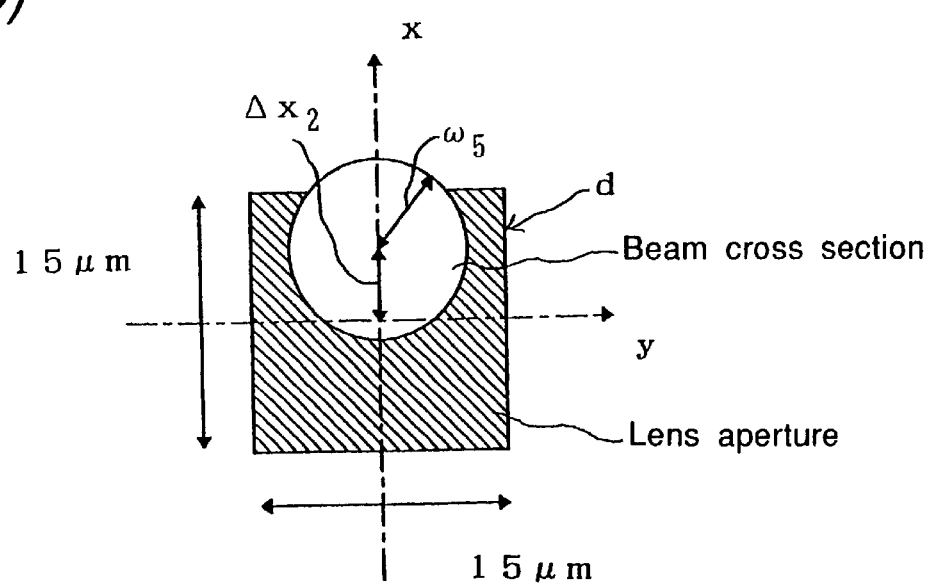

FIG. 9(B) shows how far the center of a beam deviates from the optical axis (z axis) on the light receiving plane of the photodetector d when the light source s deviates in the direction perpendicular to its optical axis. From this example, it is found that the center shifts upward (positive direction) along x axis differently from the deviation direction in FIG. 7(B).

In this case, already-described results are compared and studied about the influences on the deviations α and β when a light source deviates from a designed reference position. As the result of comparing the already-described data shown in FIGS. 3, 5, 7, and 9, it is found that the amount of light loss due to misalignment of a light source is greatly influenced by that of the second imaging lens 12 due to a vertical deviation of the optical axis of the light source. Particularly, an electronic module including a light source and a photodetector may directly be attached to a glass substrate. Therefore, in the case of packaged free-space optical interconnection, it is estimated that the error is relatively small because the distance between imaging lenses is determined by the glass substrate used or the like. As the result of comparing the equivalent amount of light and the received amount of light due to light-source axial deviations (deviation in the optical axis direction and deviation in the direction perpendicular to the optical axis) of approx. 2 to 5 μm which is the alignment tolerance to be solved by the present invention, the power loss resulting from a beam shift due to a lateral-directional deviation of the light source is the biggest problem in the case of the second imaging lens. That is, it is estimated that the lateral deviation of the light source vertical to the optical axis has the biggest influence.

However, because positioning of the electronic module in the lateral direction cannot be performed at an accuracy equal to or higher than the accuracy by flip chip bonding (as already described, the experimental error ranges between 2 and 5 μm), it can be considered that a tolerance or allowance is determined in accordance with at least the accuracy by flip chip bonding.

Figure 10:
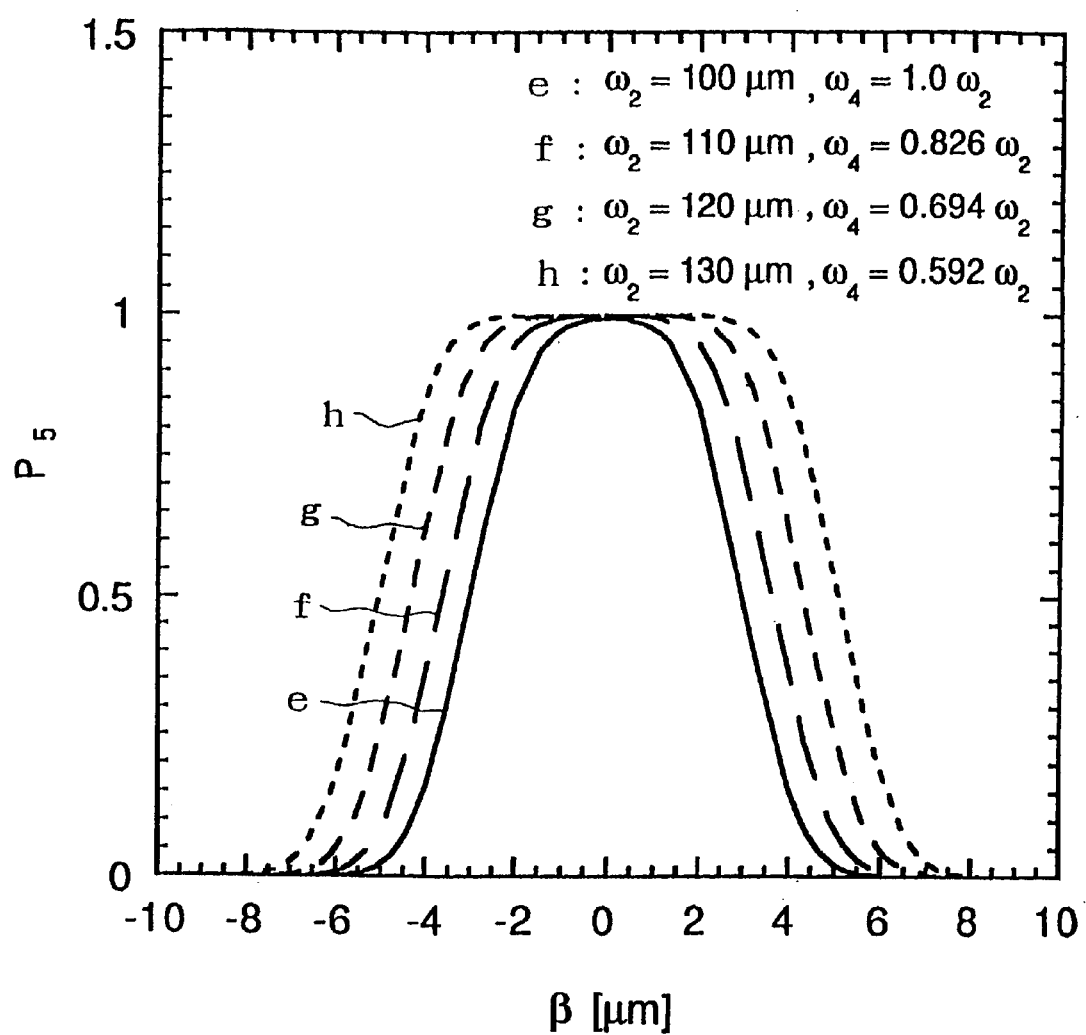
FIG. 10 is an illustration showing the relation between the deviation β of a light source in the direction vertical to its optical axis and the amount of light $P_5$ transmitted by a second imaging lens.
Figure 11A:
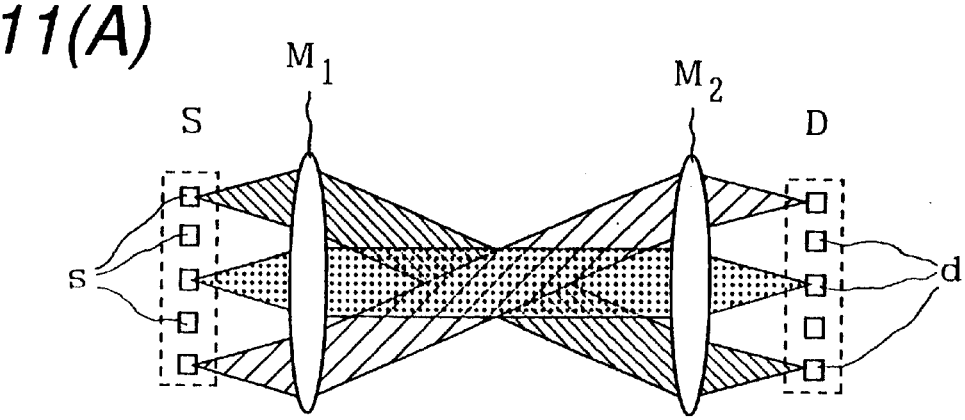
FIGS. 11(A) to 11(C) are illustrations for explaining free-space optical-interconnection systems.
Figure 11B:
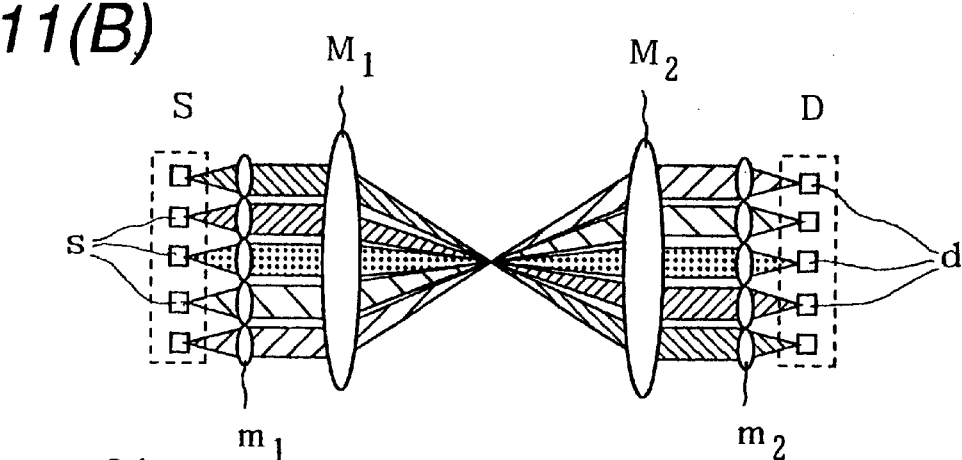
Figure 11C:
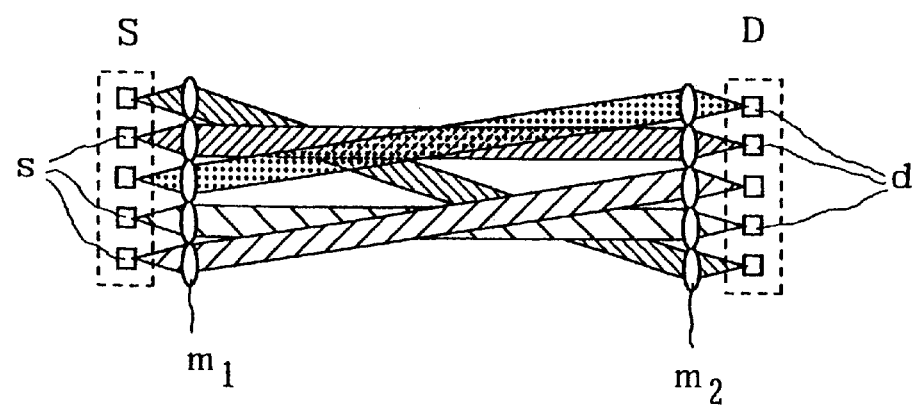

Thus, FIG. 10 shows the result of calculating the amount of light (or optical power or luminous energy) transmitting the second imaging lens due to the lateral-directional deviation of a light source on various focused Gaussian beams obtained by keeping the interconnection length constant and changing combinations of beam radiuses of two imaging lenses. In FIG. 10, the lateral-directional deviation β (μm) from the optical axis of a light source is assigned to x axis and amount of light (or optical power or luminous energy) $P_5$ transmitting the second imaging lens is assigned to y axis. The curve e is obtained by setting $\omega_2$ to 100 μm and $\omega_4$ to $1.0\omega_2$, the curve f is obtained by setting $\omega_2$ to 110 μm and $\omega_4$ to $0.826\omega_2$, the curve g is obtained by setting $\omega_2$ to 120 μm and $\omega_4$ to $0.694\omega_2$, and the curve h is obtained by setting $\omega_2$ to 130 μm and $\omega_4$ to $0.592\omega_2$. In any case, by changing β in a range of ±10 μm from the reference point (point at β=0) of a light source, β changes symmetrically to the positive and negative sides respectively from the amount of light $P_5$=1 at the reference point. Thus, it is found that, when the amount of light $P_5$ decreases to ½, β ranges between approx. ±3 μm in the case of the curve e, between approx. ±3.5 μm in the case of the curve f, between approx. ±4.5 in the case of the curve g, and between approx. ±5 μm in the case of the curve h. From FIG. 10, it is found that the alignment accuracy can be relaxed while keeping the interconnection length constant by changing the ratio between beam radiuses on the first and second imaging lenses.

As described above, the microoptical system for free-space optical interconnection and its setting method of the present invention use focused Gaussian beams and thereby position a point-light-source element, a first microlens, a second microlens, and a photodetector element so that an effective radius $\omega_2$ of a focused Gaussian beam on the first microlens is set larger than an effective radius $\omega_4$ of a focused Gaussian beam on the second microlens. Therefore, it is possible to reduce a power loss caused by the change of a beam radius on the second microlens due to the axis-directional deviation of a light source and a power loss caused by the mismatch between the beam radius of an image converted on the light receiving plane of a photodetector and the size of the light receiving plane of the photodetector. These power losses are remarkably small and thus ignorable.

Moreover, it is possible to relax the amount of light due to a deviation vertical to the optical axis of a light source by changing the ratio between beam radiuses on two microlenses while keeping the interconnection length constant and moreover relax the alignment accuracy up to an allowance of approx. 2 to 5 μm.

Therefore, the microoptical system and its setting method of the present invention can preferably be applied to the free-space optical interconnection of a packaged optical-system module in which a light source and a photodetector arranged on a glass substrate and the light source and photo detector are optically combined by focused Gaussian beams and lenses so that information processing can be performed.

What is claimed is:

1. A microoptical system for free-space optical interconnection comprising:

a point-light-source element group;

a first microlens group including a plurality of first microlenses respectively provided correspondingly to each point-light-source element of said element group;

a photodetector element group; and a second microlens group including a plurality of second microlenses respectively provided correspondingly to each photodetector element of said element group, in order to optically interconnect said first and second microlenses each other by Gaussian beams without using any microlens; wherein said point-light-source elements, first microlenses, second microlenses, and photodetector elements are positioned so that an expression of $\omega_2 > \omega_4$ (where, $\omega_2$ and $\omega_4$ are positive values) is effected when using first and second microlenses as imaging lenses and assuming the effective Gaussian-beam radius of said first microlens as $\omega_2$ and said effective Gaussian-beam radius of said second microlens as $\omega_4$.

2. The microoptical system according to claim 1, wherein said first microlens is used as an imaging lens for forming the image of said point-light-source element as an intermediate image at a position between said first microlens and said second microlens and, said second microlens is used as an imaging lens for forming said intermediate image on said photodetector element.

3. The microoptical system according to claim 1, wherein said first microlens is used as an individual lens corresponding to said point-light-source element one to one and, said individual lens is used as an embossed lens, a lens made by ion exchange, a lens using a computer generated hologram, or a compound lens.

4. The microoptical system according to claim 1, wherein said second microlens is used as an individual lens corresponding to said photodetector one to one and, said individual lens is used as an embossed lens, a lens made by ion exchange, a lens using a computer generated hologram, or a compound lens.

5. The microoptical system according to claim 1, wherein said microoptical system is used as a packaged optical system, and said point-light-source element and said photodetector element are set to an electronic module of the modules of said packaged optical system.

6. A method for setting a microoptical system for free-space optical interconnection by arranging a point-light-source element, a first microlens serving as an imaging lens, a second microlens serving as an imaging lens, and a photodetector element, wherein said point-light-source element, first microlens, second microlens, and photodetector element are positioned under the condition that the effective Gaussian-beam radius of said first microlens is larger than that of the Gaussian beams of said second microlens.

7. A method according to claim 6, wherein the following are assumed to set the microoptical system for free-space optical interconnection:

$\omega_1$—beam waist of Gaussian beams of point-light-source element;

$\omega_2$—effective Gaussian-beam radius of first microlens;

$\omega_3$—beam waist of Gaussian beams of intermediate image of point-light-source element after first microlens;

$\omega_4$—effective Gaussian-beam radius of second microlens;

$\omega_5$—beam waist of Gaussian beams at light receiving plane of photodetector element;

$L_1$—distance from point-light-source element to first microlens;

$L_2$—distance from first microlens to intermediate image;

$L_3$—distance from intermediate image to second microlens;

$L_4$—distance from second microlens to light receiving plane of photodetector;

$f_1$—focal length of first microlens;

$f_2$—focal length of second microlens;

$\lambda$—wavelength of Gaussian beams; and $\pi$—ratio of circumference of circle to its diameter, and moreover wherein:

(a) said $\lambda$, $\omega_1$, and $\omega_5$ are previously determined as known values;

(b) each of said $L_1$, $L_2$, $L_3$, $L_4$, and $f_2$ is obtained as a function of any two or more of $\omega_1$, $\omega_2$, $\omega_3$, $\omega_4$, and $\omega_5$ by using a ray matrix (also known as ABCD law or ABCD matrix);

(c) $\omega_3$ providing the maximum distance Lmax of interconnection lengths ($L_2+L_3$) between said first and second microlenses, $\omega_3$ and the maximum distance Lmax are obtained from the following expressions (I) and (II)

$$\begin{cases} L_1 = \dfrac{\pi\omega_1}{\lambda}\sqrt{\omega_2^2 - \omega_1^2} & \text{(I)} \\ L_2 = \dfrac{\pi\omega_3}{\lambda}\sqrt{\omega_2^2 - \omega_3^2} \\ L_3 = \dfrac{\pi\omega_3}{\lambda}\sqrt{\omega_4^2 - \omega_3^2} \\ L_4 = \dfrac{\pi\omega_5}{\lambda}\sqrt{\omega_4^2 - \omega_5^2} \end{cases}$$

$$\omega_3 = \dfrac{\omega_2\omega_4}{\sqrt{\omega_2^2 + \omega_4^2}} \quad \text{(II)}$$

(d) therefore, $\omega_2$ and $\omega_4$ meeting the above expression (II) are determined as values meeting said expression $\omega_2>\omega_4$ while considering design conditions by first providing the designed value of the maximum interconnection Lmax of said interconnection lengths;

(e) $\omega_3$ is determined by these $\omega_2$ and $\omega_4$ in accordance with said expression (II); and (f) said $L_1$, $L_2$, $L_3$, $L_4$, $f_1$, and $f_2$ are determined by these $\omega_1$, $\omega_2$, $\omega_3$, $\omega_4$, and $\omega_5$ to position said point-light-source element, first microlens, second microlens, and photodetector element.

8. The method according to claim 7, wherein said design conditions are:

(a) an interval between adjacent optical interconnection cables requested when a plurality of said microoptical systems are set in parallel; and (b) a relaxation degree capable of relaxing the positional deviation error of said point-light-source element by said optical interconnection.

9. The method according to claim 7, wherein the ratio (beam spot reduction ratio) between the effective Gaussian-beam radius $\omega_2$ of said first microlens and the effective Gaussian-beam radius $\omega_4$ of said second microlens is determined so that a horizontal positional deviation to the optical axis of said point-light-source element is kept in an allowable range while the combination length between said first and second microlenses is kept constant.

10. The microoptical system according to claim 2, wherein said first microlens is used as an individual lens corresponding to said point-light-source element one to one and, said individual lens is used as an embossed lens, a lens made by ion exchange, a lens using a computer generated hologram, or a compound lens.

11. The microoptical system according to claim 10, wherein said microoptical system is used as a packaged optical system, and said point-light-source element and said photodetector element are set to an electronic module of the modules of said packaged optical system.

12. The microoptical system according to claim 2, wherein said second microlens is used as an individual lens corresponding to said photodetector one to one and, said individual lens is used as an embossed lens, a lens made by ion exchange, a lens using a computer generated hologram, or a compound lens.

13. The microoptical system according to claim 12, wherein said microoptical system is used as a packaged optical system, and said point-light-source element and said photodetector element are set to an electronic module of the modules of said packaged optical system.

14. The microoptical system according to claim 2, wherein said microoptical system is used as a packaged optical system, and said point-light-source element and said photodetector element are set to an electronic module of the modules of said packaged optical system.

15. The microoptical system according to claim 3, wherein said microoptical system is used as a packaged optical system, and said point-light-source element and said photodetector element are set to an electronic module of the modules of said packaged optical system.

16. The microoptical system according to claim 4, wherein said microoptical system is used as a packaged optical system, and said point-light-source element and said photodetector element are set to an electronic module of the modules of said packaged optical system.

* * * * *